Sept. 9, 1958    HANS-JOACHIM M. FÖRSTER    2,850,869
HYDRAULIC PUMP AND MOTOR TRANSMISSION SYSTEM
Filed Oct. 11, 1954      2 Sheets-Sheet 2
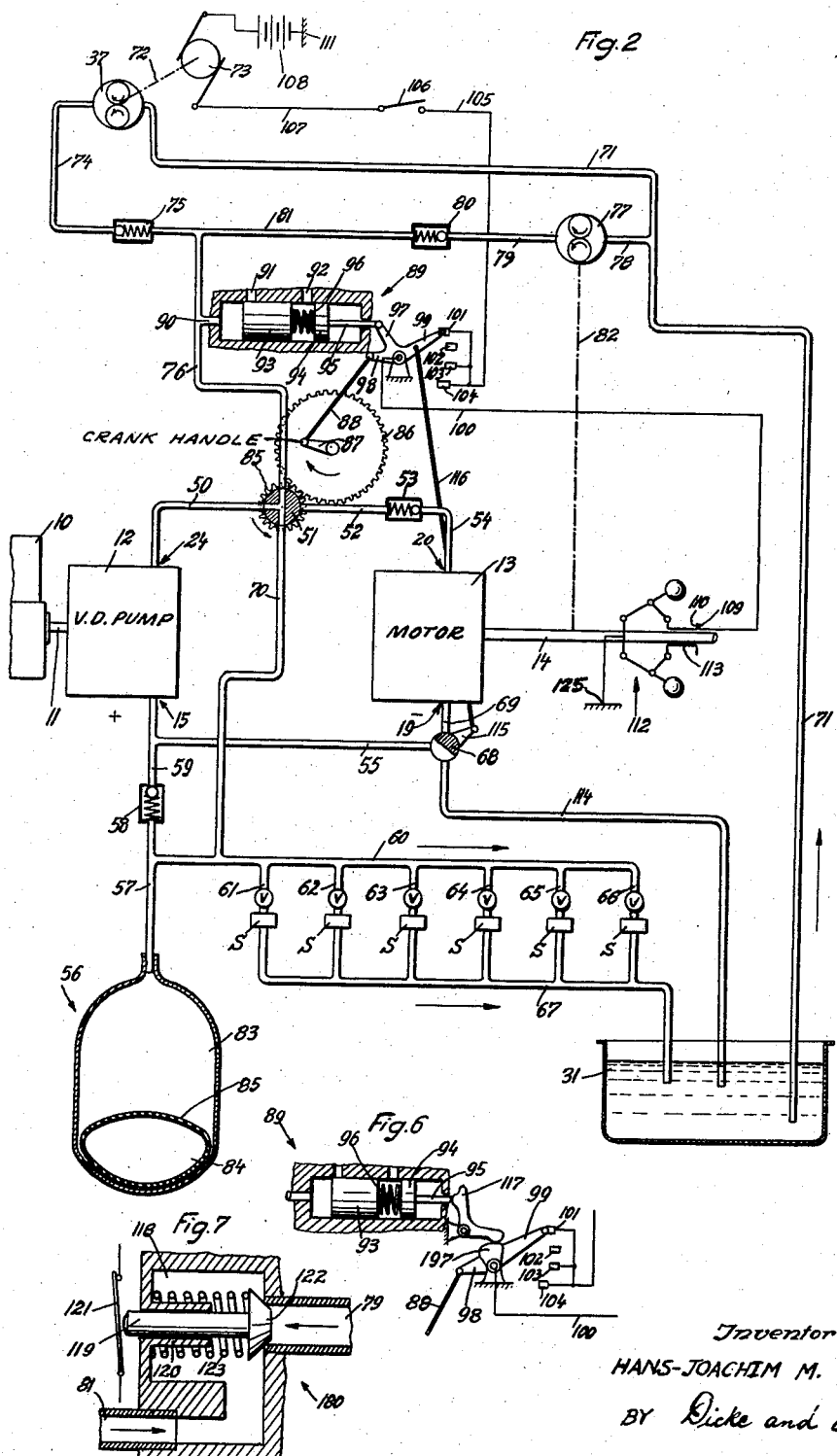
Inventor
HANS-JOACHIM M. FORSTER
BY Dicke and Craig
ATTORNEYS

United States Patent Office 2,850,869
Patented Sept. 9, 1958

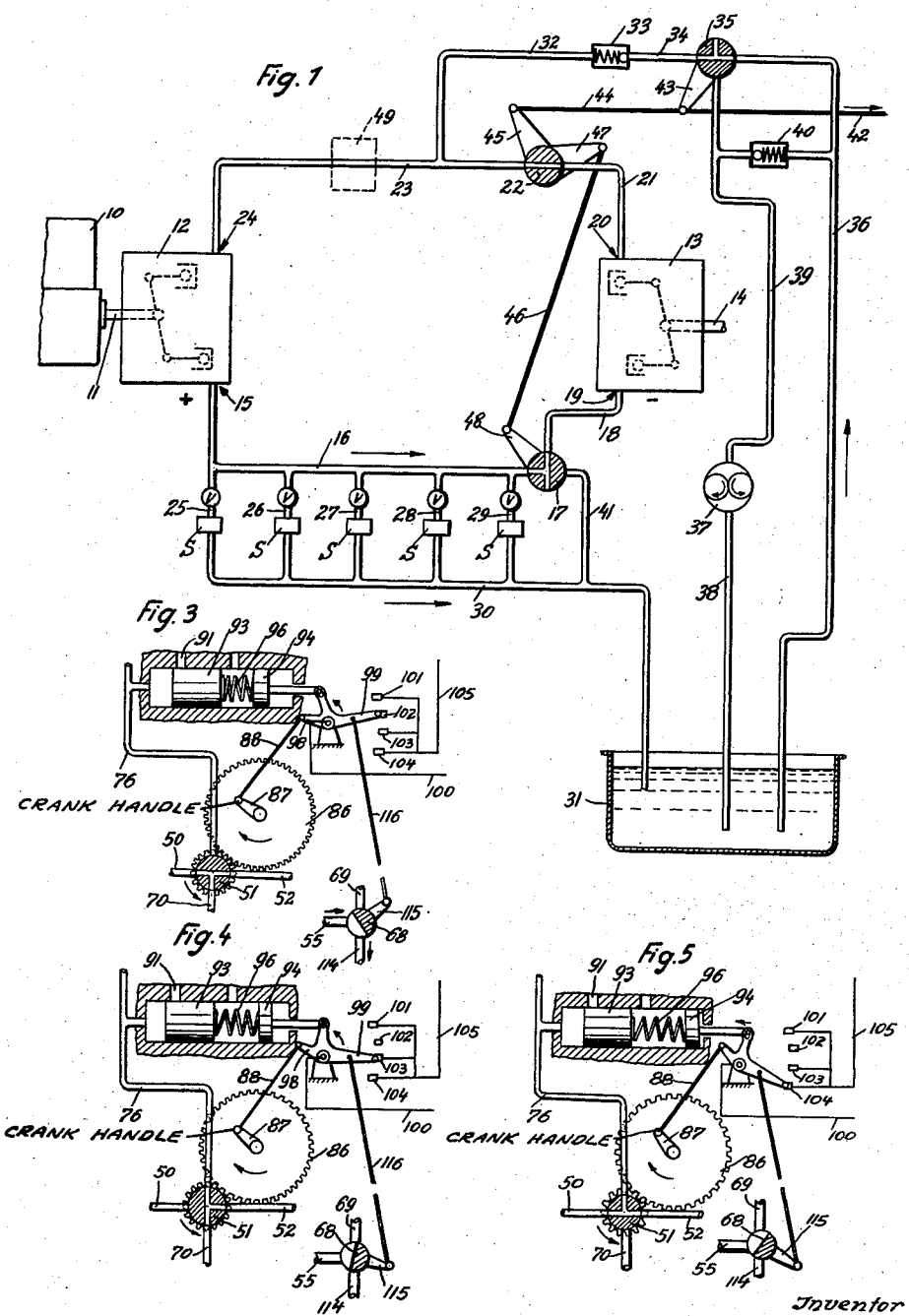

2,850,869

HYDRAULIC PUMP AND MOTOR TRANSMISSION SYSTEM

Hans-Joachim M. Förster, Stuttgart-Bad Cannstatt, Germany, assignor to Daimler-Benz Aktiengesellschaft, Stuttgart-Unterturkheim, Germany Application October 11, 1954, Serial No. 468,476

Claims priority, application Germany October 13, 1953

14 Claims. (Cl. 60—19)

My invention relates to an automotive power plant having a hydraulic transmission particularly of the type comprising a pump driven by an engine and a fluid motor fed by the pump to produce automotive power.

It is the object of the invention to provide an automotive power plant capable of supplying fluid under pressure for the operation of diverse fluid-operable mechanism with which the vehicle is equipped, thus simplifying the power plant by the elimination of the necessity of providing for a separate source of fluid pressure for such mechanism.

It is another object of the invention to utilize the transmission pump for the purpose of starting the engine, thus simplifying the power plant by the elimination of the orthodox electrical starter.

Other objects of the invention are to provide an automotive power plant including a fluid-operable starter motor capable of converting the starting power so as to meet the power demand of the engine during the starting operation, whereby a very large starter torque may be produced consistent with the range of adjustability of the fluid transmission;

To provide an automotive power plant having a hydraulic transmission composed of a pump and a fluid motor and having an auxiliary pump of simple and inexpensive design for producing the energy required to start the engine; and To provide a power plant having a hydraulic transmission composed of a fluid motor producing the automotive power and an engine-driven pump adapted to feed the fluid motor in automotive operation and to function as a starter when supplied with fluid under pressure from an auxiliary pump and/or a pressure accumulator tank.

Further objects of my invention will appear from a detailed description of a number of preferred embodiments of my invention following hereinafter, and the features of novelty will be pointed out in the claims. I wish it to be clearly understood, however, that such detailed description serves the purpose of illustrating the invention rather than that of limiting the same.

In the drawings,

Fig. 1 is a diagrammatic representation of the main pump, the fluid motor, the auxiliary pump, and the conduit and valve system connecting the same;

Fig. 2 is a diagrammatic representation similar to that of Fig. 1 of a modified power plant equipped with a pair of auxiliary pumps and a pressure controller adapted to variably determine the pressure produced by the same, the valve system and the associated controlling means being shown in the condition for starting the engine under fluid pressure supplied by both an auxiliary pump and the pressure accumulator tank;

Fig. 3 is a partial view of the system shown in Fig. 2 showing the valve mechanism and associated controlling means in the condition for starting the engine under fluid pressure produced by the accumulator alone;

Fig. 4 is a partial view of the system shown in Fig. 2 showing the valve mechanism and associated controlling means in the condition for charging the pressure accumulator tank and supplying fluid under pressure to fluid-operable vehicle equipment;

Fig. 5 is a partial view of the system shown in Fig. 2 showing the valve mechanism and associated controlling means in the condition for automotive operation;

Fig. 6 is a partial view of the system shown in Fig. 2 equipped with modified means for adjusting the pressure controller; and Fig. 7 is a diagrammatical sectional view of fluid-operable, speed-responsive means adapted to be substituted for the centrifugal governor shown in Fig. 2.

The engine 10 of the automotive power plant, which may be an internal combustion engine, drives a shaft 11 of a main pump 12 adapted to feed a fluid motor 13 with oil or another suitable liquid under pressure. The motor 13 produces the automotive power. Its shaft 14 is suitably geared to the driven wheels of the vehicle. The main pump 12 and the fluid motor 13 cooperating to constitute the hydraulic transmission may be of any desired suitable type. Preferably, both are of the type having a continuously variable displacement. In the embodiment shown, the pump 12 and the motor 13 are equipped with a plurality of pistons cooperating with a swash disk mounted on the shaft 11, or 14 respectively. The swash disk of the pump 12 and, if desired, the swash disk of the motor 13 are connected with a suitable adjusting mechanism, whereby the angle between a swash disk and the shaft may be varied to thereby alter the piston displacement and the consequent ratio of transmission between the shafts 11 and 14. Since such mechanism is well known in the art and does not form part of the present invention, it is not illustrated in the drawings.

The outlet 15 of the main pump 12 is connected by a pressure pipe 16, a three-way valve 17 and a pipe 18 to the inlet 19 of the fluid motor, whereas the outlet 20 of the latter is connected by a pipe 21, a valve 22 and a pipe 23 to the inlet 24 of the main pump 12.

For the purposes of the present invention the pressure pipe 16 has a plurality of branches 25, 26, 27, 28 and 29 which are connected to diverse fluid-operable mechanisms with which the vehicle is equipped, such as hydraulic brakes, fluid-operable steering mechanism, fluid-operable means for folding and unfolding a canvas cover, or for operating the windows or jacks or the like, such mechanisms being diagrammatically indicated at S. These mechanisms are connected to a discharge manifold 30 discharging the fluid into a reservoir 31. A branch 32 of pipe 23 is connected by a check valve 33, a pipe 34, a three-way valve 35, and a pipe 36 to the reservoir 31. The check valve 33 is mounted to open towards pipe 23.

For the purpose of starting the engine there is provided an auxiliary pump 37 adapted to feed fluid under pressure to the inlet 24 of pump 12, whereby the latter is operated as a fluid motor starting the engine 10.

The inlet of the pump 37 is connected to the reservoir 31 by pipe 38, whereas the outlet of pump 37 is connected by a pipe 39 to the three-way valve 35. The pipes 36 and 39 are connected by a check valve 40 adapted to open towards pipe 36 in order to function as a relief valve limiting the pressure produced by the auxiliary pump 37 in pipe 39. The three-way valve 17 is connected to the discharge manifold 30 by a discharge pipe 41. The three valves 17, 22 and 35 may be of the rotatable plug type, the rotatable plugs being connected to a common linkage comprising a manually operable rod 42 connected to an actuating arm 43 of valve 35, a link 44 connecting arm 43 to a first actuating arm 45 of valve 22, and a link 46 connecting a second arm 47 of valve 22 to arm 48 of valve 17. Suitable valves V may be provided for individually opening or closing the branch lines 25, 26, 27, 28 and 29.

The automotive power plant shown in Fig. 1 operates as follows:

By selectively actuating the valves V the operator may cause a portion of the fluid fed under pressure by pump 12 to be supplied to and to actuate the respective fluid-operable vehicle equipment S, the oil discharged therefrom being returned through discharge manifold 30 to the reservoir 31 from which it can be sucked up by the main pump 12 via pipe 36, valve 35, pipe 34, check valve 33, and pipes 32 and 23. When the valves V are closed, however, fluid fed under pressure by the main pump 12 is fed solely to the fluid motor 13 for producing automotive power, the torque acting on shaft 14 and the speed of rotation thereof being determined by the setting mechanism (not shown) controlling the piston displacement of the pump 12, and the motor 13 respectively. The pressure liquid discharged from fluid motor 13 through outlet 20 is returned to the inlet 24 of the pump via pipe 21, valve 22 which is in the opened position shown, and pipe 23. If desired, an additional reservoir may be included in pipes 21 or 23, as diagrammatically indicated at 49 by dotted lines.

When the engine 10 and the pump 12 connected thereto are at rest and the operator wishes to start the engine, he must shift rod 42 in the direction of the arrow to thereby turn the plugs of valves 35 and 17 in anti-clockwise direction and valve 22 clockwise through an angle of 90°. As a result, valve 35 will cause pipe 34 to be cut off from discharge line 36 and to be connected to pipe 39 and pump 37. At the same time valve 17 will cause pipe 16 to be cut off from pipe 18 and to be connected to pipe 41. Valve 22 will cut off pipe 21 from pipe 23. Hence, it will appear that inlet 19 and outlet 20 of fluid motor 13 will be shut off and that fluid under pressure will be supplied by pump 37 from reservoir 31 via pipes 38, 39, 34, 32 and 23 to the inlet 24 of the main pump 12. This pump will now operate as a starter motor starting the engine 10. By suitably altering the piston displacement of pump 12 from a maximum to a minimum, the operator may cause pump 12 to initially produce its maximum torque at a minimum speed and to gradually reduce the torque and increase the speed of rotation of shaft 11 whereby a smooth gradual starting operation is achieved. The oil discharged from outlet 15 is returned to reservoir 31 through pipe 16, valve 17 and pipes 41 and 30.

The auxiliary pump 37 is operated by means independent of the internal combustion engine 10, for instance by an electric motor not shown, or by a hand crank or the like.

The power plant illustrated in Fig. 1 is capable of numerous modifications. Thus, for instance a pressure accumulator tank, such as will be described later with reference to Fig. 2, may be substituted for the auxiliary pump 37. Also, the arrangement may be provided according to my application Serial No. 437,427 in that a transmission pump is substituted for the pump shown in the prior application as acting as a starter. Moreover, transmission pump and transmission fluid motor may be combined to form a unit, as disclosed in my prior Patent No. 2,817,250 (application Serial No. 205,296).

A modified power plant embodying my invention is illustrated in Figures 2–7. In these figures, the same reference numerals have been applied to the corresponding elements, such as engine 10, main pump 12, fluid motor 13, auxiliary pump 37, and fluid-operable vehicle equipment S.

Inlet 24 of the main pump 12 is connected with outlet 20 of fluid motor 13 by a pipe 50, a three-way valve 51, a pipe 52, a check valve 53, and a pipe 54, the check valve 53 opening towards the three-way valve 51. The outlet 15 of the main pump 12 is connected with the inlet 19 of the fluid motor by a pipe 55, a three-way valve 68 and a pipe 69, but may be connected with the reservoir 31 via the pipe 55, the valve 68 and a pipe 114.

The pipe 55 is connected to a pressure accumulator tank 56 by a branch 59, a check valve 58 and a pipe 57, such check valve opening towards the pressure accumulator tank 56. A supply line 60 permanently communicating with the pressure accumulator 56 through pipe 57 has a plurality of branches 61, 62, 63, 64, 65 and 66 leading to diverse fluid-operable mechanisms S similar to those shown in Fig. 1 and described with reference thereto. The oil discharged from the mechanisms S is collected by a manifold 67 discharging into the reservoir 31. A port of three-way valve 51 is in permanent communication with the accumulator tank 56 via a pipe 70 which leads to pipe 60.

The inlet of the auxiliary pump 37 communicates with the reservoir 31 by a pipe 71. The pump 37 is drivingly connected by suitable means diagrammatically shown at 72 to an electric motor 73. The outlet of the auxiliary pump 37 is connected with a port of three-way valve 51 via a pipe 74, a check valve 75 adapted to close such pipe, and a pipe 76. There is provided a second auxiliary pump 77 shunted across the pump 37. To this end, the inlet of pump 77 is connected to a branch 78 of suction pipe 71, whereas its outlet is connected to pipe 76 via a pipe 79, a check valve 80 and a pipe 81. Both of the check valves 75 and 80 are adapted to open towards pipe 76 leading to valve 51.

The second auxiliary pump 77 is preferably geared to the driven shaft 14 of the fluid motor 13 by suitable means diagrammatically indicated by the dash-dotted line 82.

The pressure accumulator 56 is preferably provided with a movable partition separating its interior into a fluid chamber 83 and a gas-filled chamber 84. I prefer to form the gas-filled chamber by a bag 85 of a flexible material, such as synthetic rubber, which is inflated by a suitable gaseous medium, such as air, and is loosely inserted in the tank 56 which consists of steel. When a suitable fluid, such as oil, is fed under pressure into the tank 56, it will fill the space 83 and compress the inflated bag 85. The pressure of the gaseous medium therein keeps the oil under continuous pressure. In practice, the tank is so mounted that its outlet communicating with pipe 57 will be disposed at the bottom so that it will not be blocked by the floating bag.

The three-way valve 51 is preferably of the rotatable plug type, its plug having pinion teeth 85 meshing with a gear 86 rotatably journalled in bearings rigidly connected with the housing of valve 51. The gear 86 is provided with a hand crank 87 which is connected by a link 88 to a pressure controller 89 adapted to variably limit the pressure produced by the auxiliary pump 37 or 77 in pipe 76.

The pressure controller 89 comprises a valve housing having a cylindrical bore provided with ports 90, 91, 92 and accommodating a valve piston 93, a head 94 fixed to a rod 95, and a helical spring 96 interposed between the piston 93 and the head 94. The rod 95 extends through an opening in the end wall of the cylinder and is connected by pin and slot to one arm 97 of a three-armed lever having a second arm 98 connected to link 88, and a third arm 99. The arm 99 is electrically insulated and suitably connected to an electrical wire 100. Four electrical contacts 101, 102, 103 and 104 carried by a stationary insulating plate not shown are mounted in spaced relationship for selective engagement by arm 99. Contacts 101, 103 and 104 are connected by a wire 105 to a switch 106 connected by a wire 107 to one terminal of the electric motor 73, the other terminal of which is connected to a battery 108. Wire 100 is connected to a stationary contact 109 adapted to cooperate with a movable contact 110 which is grounded and thus connected to the other terminal of the battery which is likewise grounded as shown at 111. The contact 110 is movable by a centrifugal governor 112 mounted on or geared to the shaft 14 or the shaft 82, such governor including a shiftable sleeve 113 carrying contact 110. The governor is so designed and adjusted that it will close contacts 109, 110 in resting condition and will open the same when the speed of the driven shaft 14 exceeds a predetermined limit.

The ports 91 and 92 of the pressure controller communicate with the reservoir 31 by suitable return pipes not shown.

The rotatable plug of valve 68 is so recessed as to connect pipe 55 alternatively with pipe 69 or pipe 114 and has an arm 115 connected by a link 116 with arm 99.

The electric motor 73 may be connected by suitable disengageable means, such as a clutch, to shaft 11 and therefore adapted, when driven by the engine, to serve as the generator of the vehicle.

The operation of the power plant shown in Fig. 2 is as follows:

Starting position I (Fig. 2)

The engine 10, the main pump 12 and the fluid motor 13 are at rest. When the driver wishes to start the engine, he must turn hand crank 87 to the position shown in Fig. 2 and must close starting switch 106.

In this position, the three-way valve 51, will connect the pipes 76, 70 and 50. The three-armed lever 97, 98, 99 is so adjusted that its arm 99 engages contact 101 and sets valve 68 so as to disconnect pipe 55 from fluid motor inlet 19 and to connect it with return pipe 114.

The head 94 is in its left end position in which the spring 96 is stressed to its maximum pressure causing piston 93 to close the relief port 91 of the pressure line 76 until the pressure therein will have reached its maximum limit. Only when the pressure tends to exceed such limit will piston 93 be pushed to the right to an extent permitting the surplus fluid to discharge through port 91 thereby limiting the maximum pressure.

An electrical circuit is established extending from ground 125 through the centrifugal governor 112, contact 110, contact 109, wire 100, arm 99, contact 101, wire 105, switch 106, wire 107, electric motor 73, and battery 108 to ground 111. Hence, closing switch 106 causes the electric motor 73 to start and to operate the auxiliary pump 37 which sucks liquid from reservoir 31 through pipe 71 and delivers it to pipe 76 setting up pressure therein, such pressure being the maximum pressure determined by the pressure controller 89. Since valve 51 connects pipe 76 with the inlet 24 of the main pump and through pipes 70, 60 and 57 with the pressure accumulator tank 56 and the fluid-operable vehicle equipment S, and since outlet 15 of the main pump 12 is connected by pipe 55 and valve 68 with the return pipe 114, fluid under pressure is supplied to inlet 24 of the main pump 12 from both sources 37 and 56 of pressure fluid, whereby the pump 12 acting as a fluid motor will commence to revolve at an increasing speed thus starting the engine 10 through shaft 11. In this phase of the operation, the driver initially adjusts pump 12 to its maximum piston displacement to enable it to produce a powerful starting torque and, once shaft 11 has reached a certain speed, he may gradually reduce the piston displacement of pump 12 to thereby reduce the fluid consumption of pump 12. During the starting operation, the diverse fluid-operable mechanisms S are being supplied with fluid under pressure from both sources 37 and 56.

Starting position II (Fig. 3)

In lieu of adjusting hand crank 87 to the position shown in Fig. 2, the driver, desirous of starting the power plant, may adjust the hand crank 87 to the position shown in Fig. 3 in which the valve 51 closes pipes 76 and connects the pipes 50, 52 and 70 causing fluid under pressure to be supplied to inlet 24 of the main pump 12 from the accumulator tank 56 via pipes 57 and 70, valve 51 and pipe 50. The pipe 52 likewise supplied with fluid under pressure, is kept closed by check valve 53. Arm 99 of the three-armed lever 97, 98, 99 is moved into engagement with contact 102 which is insulated from wire 105 and, therefore, will not establish a circuit through motor 73, even should the driver close switch 106. Therefore, pump 37 will be disabled and will not produce any pressure in pipe 76. Otherwise the starting operation will be the same as described with reference to the starting position I.

The fluid-operable vehicle equipment S will be supplied with fluid under pressure from tank 56. Should it happen that the source of fluid pressure becomes exhausted before engine 10 will develop power, the driver must set hand crank 87 to the position shown in Fig. 2 thereby putting the auxiliary pump 37 into operation which will recharge the accumulator tank 56 and supply fluid under pressure to pump inlet 24. Alternatively, the driver may temporarily set the hand crank 87 to the position shown in Fig. 4, which will be described later, to thereby recharge the accumulator tank 56 and may then return the hand crank 87 to the position shown in Fig. 3 to repeat the starting operation. Under normal conditions, however, provided that the capacity of accumulator tank 56 is sufficiently large, and further provided that the fluid-operable vehicle equipment S does not unduly drain the accumulator tank, the accumulated quantity of fluid under pressure will enable the main pump 12 to start the engine 10 successfully. It is to be understood, of course, that, alternatively, the driver may use position I (Fig. 2) at the outset in order to cause both sources 56 and 37 of fluid under pressure to cooperate in feeding the main pump 12 for the starting operation.

Servo-position (Fig. 4)

When the engine is at rest or is idling and the driver wishes to charge the accumulator 56 and/or to operate any of the mechanisms S, he will adjust the hand crank 87 to the position shown in Fig. 4 in which the valve 51 closes the inlet 24 and pipe 50 and connects the pipes 76, 70 and 52 moving arm 99 into engagement with contact 103. Moreover, the driver will close switch 106 closing the circuit of electric motor 73 via arm 99, contact 103 and wire 105 and thereby causing the auxiliary pump 37 to produce pressure in pipe 76, such pressure being maintained by pressure controller 89 at a lower limit due to a relaxation of spring 96. In this position, the pump 37 will charge the pressure accumulator tank 56 and will supply fluid under pressure to the vehicle equipment S. Therefore, such equipment may be operated by the driver although the vehicle is stationary, the engine being at rest.

Position for normal driving operation (Fig. 5)

When the engine is running and the driver wishes to start the vehicle, he must set the hand crank 87 to the position shown in Fig. 5 thereby turning the rotatable plug of valve 51 to the position in which pipe 70 is shut off while the pipes 50, 52 and 76 are interconnected. Arm 99 is moved into engagement with the lowermost contact 104 thereby establishing a circuit through the electric motor 73. Valve 68 is so adjusted as to disconnect pipe 69 from return line 114 and as to connect it with pipe 55. Hence, a fluid circuit is now established from pump outlet 50 to fluid motor inlet 19 and from fluid motor outlet 20 to pump inlet 24. Moreover, the low pressure section of this circuit comprising pipes 50 and 52 communicates with the pressure line 76 in which the pressure is maintained by pressure controller 89 at the low limit determined by the uttermost relaxation of spring 96 owing to the displacement of head 94 to its right hand end position. This pressure is so chosen that a positive pressure exceeding atmospheric pressure will be maintained in the low pressure section of the fluid circuit of the hydraulic transmission.

The driver may now so control the ratio of transmission by suitable adjustment of the piston displacement of the main pump 12 and, if desired, of the fluid motor 13 as to start the vehicle. The contacts 109 and 110 included in the electrical circuit of motor 73 will remain closed as long as the speed of travel of the vehicle does not exceed a certain limit. As soon as that limit will be reached, however, the shaft 14 will cause the centrifugal governor 112 to shift sleeve 113 to the left thereby disengaging the contacts 109 and 110, whereby motor 73 will be stopped and auxiliary pump 37 will be disabled causing check valve 75 to close. When that happens, however, the second auxiliary pump 77 geared to shaft 14 will feed a sufficient quantity of liquid through check valve 80 to maintain the pressure in line 76 at the limit determined by the adjustment of the pressure controller 89.

The auxiliary pump 37 operated by means, such as motor 73, independent of the internal combustion engine 10 must be so chosen as to be capable of maintaining the low pressure section of the transmission circuit under pressure when the vehicle is travelling at reduced speeds at which the pump 77 is incapable of feeding the required quantity of liquid. Moreover, the capacity of pump 37 must suffice to supply the liquid under pressure required by the vehicle equipment S during such stages of operation in which neither auxiliary pump 77 nor the main vehicle pump 12 nor the accumulator tank 56 supply such liquid. Moreover, the auxiliary pump 37 must supply the quantity of fluid under pressure required for the starting operation either directly to the inlet 24 of the main pump 12 or indirectly by charging the accumulator tank 56.

During normal driving operation of the vehicle the accumulator tank 56 will be charged from the outlet 15 of the main pump through the check valve 58 whenever the pressure produced by the main pump exceeds that prevailing in the pressure accumulator. Therefore, fluid under pressure will be available for operation of the vehicle equipment irrespective of the varying feed of the main pump and of the second auxiliary pump 77.

The embodiments described heretofore are capable of numerous modifications. Thus, a cam 197 may be substituted for arm 97 as illustrated in Fig. 6, one arm of a bell crank 117 constituting a follower engaging cam 197, and the other arm of bell crank 117 engaging rod 95. The cam 197 has a dwell keeping bell crank 117 and rod 95 more or less stationary to compress spring 96 of the pressure controller 89 to its limit when the hand crank 87 is set to starting position I, or starting position II, or the servo-position above described. Only when the hand crank 87 is set to the normal driving position shown in Fig. 5 will the cam 197 relieve bell crank 117 relaxing spring 96 for a reduction of the pressure in pipe 76 to a degree slightly exceeding atmospheric pressure.

While in the embodiment described with reference to Figs. 2, 3, 4 and 5 the speed-responsive means adapted to respond to the speed of the fluid motor 13 and to operate means, such as 109, 110, to disable the auxiliary pump 37, is a centrifugal governor 112, it may be formed by an element operable by the difference of the pressures produced by the two auxiliary pumps 37 and 77.

Such speed-responsive means is illustrated in Fig. 7 showing a check valve 180 to be substituted for check valve 80 in Fig. 2. In the event of such substitution, wire 100 is grounded. The housing of valve 181 has a chamber 118 which communicates with the pipes 79 and 81 and accommodates a poppet valve having a stem 119 which is guided in a sleeve 120 and extends out of the valve housing into proximity of a normally closed switch 121. The head 122 of the poppet valve tends to close pipe 79 under the pressure of a helical spring 123 which surrounds sleeve 120 and rests on the end wall of the valve housing. The check valve 180 remains closed as long as the pressure produced by pump 37 exceeds that produced by pump 77. As soon as pump 77 feeds through pipe 79 a quantity of liquid lifting valve head 122 from its seat a distance sufficient to cause stem 119 to open switch 121, the electric motor 73 will be stopped thereby disabling the auxiliary pump 37. Since the displacement of the poppet valve 119, 122 depends on the rotary speed of the auxiliary pump 77, it will appear that the check valve illustrated in Fig. 7 constitutes a speed-responsive means adapted to respond to the speed of the fluid motor 13, and that the switch 121 constitutes means operable by the speed-responsive means, when the speed of the fluid motor 13 exceeds a certain limit, to disable the auxiliary pump 37.

While I prefer the provision of a pressure accumulator, such as 56, and a pair of auxiliary pumps, such as 37 and 77, it is to be understood that many objects of my invention are attainable by a power plant equipped with a single auxiliary pump only. Also, the valve means described may be so simplified as to permit but of a single starting position.

From the foregoing description it will appear that in my novel power plant fluid under pressure, such as oil, fed by the main pump of the hydraulic transmission may be used at the same time for the operation of diverse fluid-operable equipment of the vehicle. The main pump serves at the same time as a source of pressure fluid for such equipment whereby the power plant is materially simplified.

In a preferred embodiment of the invention the hydraulic transmission, particularly the main pump, serves the additional function as a starter motor for the vehicle engine, fluid under pressure being supplied to the inlet of the main pump by the auxiliary pump which may be driven by an electric motor or otherwise, for instance by a hand crank. This involves the advantage that the orthodox electrical starter motor may be omitted, whereby the power plant is simplified, and that a very powerful initial starting torque may be produced when the main pump is adjusted to its maximum piston displacement, such torque being greater than that produced by the orthodox electrical starter motor. No special starting mechanism is required except for the auxiliary pump 37 which is of simple and inexpensive design.

The provision of the additional auxiliary pump 77, which relieves the auxiliary pump 37 from operation during the travel of the vehicle, increases the efficiency of the power plant by reducing the consumption of electrical energy. The auxiliary pump 37 operable independently of the vehicle engine may be employed to recharge the accumulator tank whenever the same becomes exhausted. The valve means disclosed permit the power plant to be set up either for normal driving operation, or for starting operation, or for servo-operation in which the fluid-operable equipment S of the vehicle may be operated when the engine is at rest or is idling.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. Automotive power plant comprising an internal combustion engine, a main pump driven thereby, a fluid motor fed by said pump, fluid-operable vehicle equipment, an auxiliary pump, means independent of said internal combustion engine for operating said auxiliary pump, a pressure accumulator tank, conduits hydraulically connecting said accumulator tank to the outlet of said auxiliary pump and to the inlet of said main pump and connecting said fluid-operable vehicle equipment in parallel with said accumulator tank and with the outlet of said auxiliary pump, and valve means inserted in said conduits and movable to various positions and operative in one of said positions to connect said pressure accumulator tank for loading purposes to the outlet of said auxiliary pump and operative in another of said positions to connect said pressure accumulator tank to the inlet of said main pump for the purpose of operating the same as a starter for said engine and to disconnect said accumulator tank from said auxiliary pump.

2. The combination claimed in claim 1 in which said accumulator tank is provided with a movable partition separating its interior space into a fluid chamber and a gas-filled chamber.

3. The combination claimed in claim 1 in which said accumulator tank includes a gas-inflated bag consisting of a flexible material.

4. Automotive power plant comprising an internal combustion engine, a main pump driven thereby, a fluid motor fed by said main pump, a pair of auxiliary pumps, an electric motor for operating one auxiliary pump of said pair, motion-transmitting means drivingly connecting the other pump of said pair to said fluid motor, speed-responsive means responsive to the speed of said fluid motor, means operable by said speed-responsive means, when said speed exceeds a certain limit, to disable said one auxiliary pump, first conduits hydraulically connecting the outlets of said auxiliary pumps with the inlet of said main pump, second conduits connecting the outlet of said main pump with the inlet of said fluid motor and with exhaust, and valve means inserted in said conduits and movable to a first position in which it opens said first conduits and connects the outlet of said main pump with exhaust for the purpose of operating said main pump as a starter motor for said engine.

5. The combination claimed in claim 4 further comprising a switch cooperatively connected with said speed-responsive means for stopping said electric motor when said speed exceeds a predetermined limit.

6. The combination claimed in claim 1 further comprising conduits connecting said pressure accumulator tank with said vehicle equipment and with the outlet of said main pump, and a check valve in one of said conduits connecting the outlet of said main pump to said accumulator tank and constructed to open towards the latter, said valve means being formed by a selector valve selectively connecting said accumulator tank to the outlet of said auxiliary pump or to the inlet of said main pump or to both.

7. The combination claimed in claim 6 in which said selector valve is manually operable.

8. The combination claimed in claim 4 in which said speed-responsive means is responsive to the pressure produced by said other pump of said pair, said pressure depending on the speed of said fluid motor.

9. Automotive power plant comprising an internal combustion engine, a main pump driven thereby having an inlet and an outlet and operable as a starter for said engine by the supply of fluid under pressure to said inlet, a fluid motor hydraulically connectible in a circuit with said main pump to produce automotive power, an auxiliary pump, means independent of said internal combustion engine for operating said auxiliary pump, a pressure accumulator tank, a duct including a check valve connecting said outlet to said accumulator tank and constructed to open towards the latter, and conduits and adjustable valve means included therein selectively settable to three conditions, said conduits and said valve means being operative in the first condition to connect said accumulator tank to said inlet and to connect said outlet with exhaust for starting the engine, in the second condition to connect said accumulator tank to the outlet of said auxiliary pump to be charged thereby and to simultaneously close said inlet, and in the third condition to establish said circuit through said main pump and said fluid motor for automotive operation and to connect the outlet of said auxiliary pump to said inlet for the maintenance of pressure throughout said circuit.

10. The combination claimed in claim 9 further comprising an adjustable pressure controller connected with the outlet of said auxiliary pump for variably limiting the pressure produced by said auxiliary pump and mechanically connected with said valve means and adjustable in dependence on the setting thereof.

11. The combination claimed in claim 9 further comprising a pressure controller connected with the outlet of said auxiliary pump for variably relieving the pressure produced by said auxiliary pump, and means mechanically connecting said controller with said adjustable valve means for variably adjusting said controller.

12. Automotive power plant comprising an internal combustion engine, a main pump driven thereby, a fluid motor hydraulically connected with said main pump to be driven thereby, fluid-operable vehicle equipment, a first auxiliary pump, an electric motor drivingly connected to said first auxiliary pump, a second auxiliary pump by-passing said first auxiliary pump and mechanically connected to said fluid motor to be driven thereby, control means responsive to operation of said fluid motor and effective to disable said electric motor when said fluid motor operates and to enable said electric motor to drive said first auxiliary pump when said fluid motor is substantially inactive, conduits hydraulically connecting the inlet of said fluid motor and said equipment to the outlet of said main pump, further conduits hydraulically connecting the outlets of said auxiliary pumps to the inlet of said main pump and to the outlet of said fluid motor, and valve means inserted in said conduits and movable to at least two positions and operative in one of said positions to hydraulically connect the outlet of said first auxiliary pump to the inlet of said main pump for the purpose of operating the same as a starter motor for the engine and operative in the second one of said positions to supercharge said further conduits.

13. The combination claimed in claim 12, in which each of said auxiliary pumps is provided with a suction line and a pressure line and with a check valve in one of said lines.

14. Automotive power plant comprising an internal combustion engine, a main pump driven thereby, a fluid motor fed by said pump, fluid-operable vehicle equipment, an auxiliary pump, means independent of said internal combustion engine for operating said auxiliary pump, a pressure accumulator tank, conduits hydraulically connecting said accumulator tank to the outlet of said auxiliary pump and to the inlet of said main pump, valve means inserted in said conduits and movable to various positions and operative in one of said positions to connect said pressure accumulator tank for loading purposes to the outlet of said auxiliary pump and operative in another of said positions to connect said pressure accumulator tank to the inlet of said main pump for the purpose of operating same as a starter for said engine and to disconnect said accumulator tank from said auxiliary pump, and circuits connecting said fluid-operable vehicle equipment in parallel with said accumulator tank to the outlet of said auxiliary pump means downstream of said valve means.

References Cited in the file of this patent
UNITED STATES PATENTS
2,257,724   Bennetch _____ Oct. 7, 1941